(No Model.)
F. O. PHELPS.
SPRING LOCK.
No. 347,957. Patented Aug. 24, 1886.
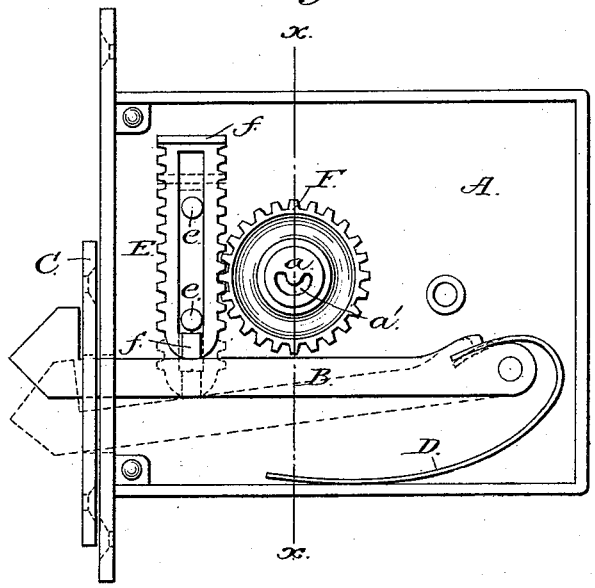
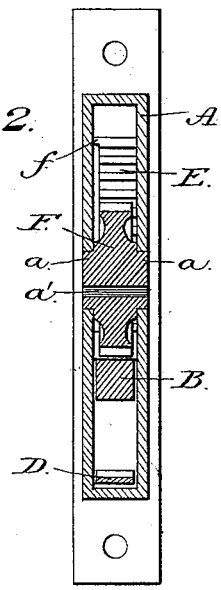
WITNESSES:
John A. Ellis
C. Sedgwick
INVENTOR:
F. O. Phelps
BY Munn & Co
ATTORNEYS.

United States Patent Office.

FRANK ORLANDO PHELPS, OF BLUE ISLAND, ILLINOIS.

SPRING-LOCK.

SPECIFICATION forming part of Letters Patent No. 347,957, dated August 24, 1886.

Application filed June 5, 1886. Serial No. 204,257. (No model.)

*To all whom it may concern:*

Be it known that I, FRANK ORLANDO PHELPS, of Blue Island, in the county of Cook and State of Illinois, have invented a new and useful Improvement in Spring-Locks, of which the following is a full, clear, and exact description.

My invention relates to spring-locks, and has for its object the production of a simple, cheap, and durable article.

It consists in the combination, with a spring-actuated pivoted bolt, of a slotted double rack and a toothed wheel engaging the rack, and adapted to be turned by a key, as will be hereinafter fully described and claimed.

Accompanying the specification, and forming part of it, are drawings, in which Figure 1 is a side view of my lock with the casing removed, the positive lines showing the position of the parts when closed and the dotted lines when open. Fig. 2 is a vertical section through line $x\ x$ of Fig. 1.

A designates the casing of my lock, and B a bolt pivoted at one end to the casing, the other end projecting through a slot therein, being provided with a suitable catch to engage the face-plate C.

D is a spring, firmly secured at one end to the pivoted end of the bolt B, and from thence carried outwardly and downwardly, bearing at its free end against the side of the casing A.

E designates a double rack, slotted longitudinally to engage guide-pins $e\ e$ in the casing, and bearing at its lower rounded end on the bolt B.

$f\ f$ are offsets designed to fill the space between the rack and the side casing.

F is a toothed wheel, the cogs of which mesh with the teeth of the rack. Cast solid therewith is the hub $a$, extending on each side and journaled in apertures in the casing. In this hub, and extending through from side to side, is an irregular slot, $a'$, adapted to receive a key. Thus the lock can be operated from either side at will.

The lock, as shown in the drawings, is of the mortise pattern; but my novel arrangement is equally applicable to many other styles. The key may be dispensed with and handles used instead without departing from the spirit of my invention. This form is especially adapted to inside sliding partition-doors.

In the operation of my spring-lock the key, after being inserted, is turned, causing the toothed wheel F to carry forward the slotted double rack E upon its guide-pins $e\ e$, and thereby drive the bolt back to an open position, as shown in dotted lines in the accompanying sheet of drawings. Upon releasing the key the lock springs back to its first or closed position.

The slotted double rack E is provided with teeth in both edges, in order that however placed upon its guide-pins in the lock it will be in an operative position.

The entire construction of my lock is such that simplicity is united throughout with strength and durability.

I am aware that mortise-locks have heretofore been constructed wherein a rack is employed integral with a spring-actuated bolt, operated by a pinion located upon a knob-spindle, and I do not make claim to such.

Having thus described my invention, what I claim as new, and desire to secure by Letters Patent, is—

1. The combination, with a spring-actuated bolt, of a slotted double rack held to slide in the lock-casing and a toothed wheel journaled by its hub in the casing, substantially as herein set forth.

2. The combination, with a lock-casing having guide-pins $e$ and a spring-actuated lock-bolt, B, pivoted in the casing, of the slotted double rack E, adapted to engage the top of said bolt, and the toothed wheel F, journaled in the casing and provided with the irregular slot $a'$, adapted to receive a key, substantially as set forth.

3. The spring D, securely fastened at one end to the pivoted bolt B, and extending from thence outwardly and downwardly, bearing at its free end against the casing A, in combination with the slotted double rack E, adapted to engage the top of the bolt sliding upon pins $e\ e$, and the toothed wheel F, adapted to be operated by a key, substantially as set forth.

FRANK ORLANDO PHELPS.

Witnesses:
ASA FARNAM,
STEPHEN D. JONES.